United States Patent Office 2,783,214
Patented Feb. 26, 1957

2,783,214

METHOD OF PRODUCING A SOLIDIFIED CURED RESIN

Edward C. M. Homan, Montclair, N. J., assignor to Cordo Chemical Corporation, Norwalk, Conn., a corporation of Connecticut No Drawing. Application June 2, 1952,
Serial No. 291,111

9 Claims. (Cl. 260—28)

This invention relates to the provision of a self-curing resin material, i. e. in providing compositions and procedure whereby a mixture is established that will cure promptly and of its own accord to yield a tough, hard, resistant resin product having unusual properties of strength, inertness, and adhesion to other materials.

While so-called self-curing resins have been known in the art, or more particularly self-curing resin mixes which when suitably prepared in a fluid or semi-fluid state will of their own accord set up into a more or less solid body, these compositions have been found objectionable in one way or another, at least for many important purposes, such as rapid manufacture of plastic (i. e. resin) parts or structures, various repair or replacement operations, and the like. In some cases the time required for the spontaneous reaction of cure is unduly long for certain purposes, e. g. even a matter of hours or days, while in other cases (and even if a long curing time might be permitted) the required reagents, such as catalysts or accelerators, are hazardous to use, as in releasing highly inflammable vapors or in being susceptible of spontaneous combustion or violent disintegration under heat or other influences that may arise. In still other cases, the ultimate resin product has certain shortcomings, e. g. in lacking qualities of strength and durability or in being susceptible to attack (for instance by organic liquids, water or steam) or in lacking suitable properties of adhesion or the like. Thus certain so-called polyester resins have been made up in self-curing mixtures, and likewise resins of the melamine-aldehyde condensate type, but these and others have been subject to one or more of the various difficulties outlined above, with corresponding limitation on their utility.

While the resin material produced by reaction of epichlorohydrin with bisphenol has been found capable of yielding, in its ultimately cured state, a remarkably strong, durable and inert product, and while it has been known that such material can be cured with the aid of various acids (organic or inorganic) or certain alkalies (including one or another of various amines), the curing reaction has apparently always required a considerable time, and indeed in some cases has necessitated the application of heat from another source in order to achieve a properly complete cure. Further information about resin-forming materials of the epichlorohydrin-bisphenol type (to which the present invention is applicable) may be found in the literature including patents such as represented by Nos. 2,324,483 (July 20, 1943) and 2,444,333 (June 29, 1948) to Pierre Caston, and No. 2,575,558 (November 20, 1951) to Herbert A. Newey, et al. The known resin-forming material which is derived from epichlorohydrin-bisphenol and which may be here conveniently identified as epichlorohydrin-bisphenol reaction product, has been commercially available for some time, one such product (particularly suitable for present purposes) being known as Araldite.

As supplied in an uncured, stable state, this resin-forming material is usually embodied in the form of a thick liquid, having the viscosity of heavy molasses but convertible on proper curing, to a tough, hard resin (presumably involving a cross-linking, with some degree of polymerization, such cross-linkage extending to the curing agent, e. g. to a nitrogen group of an amine) which has good characteristics of adhesion both to itself (i. e. previously solidified bodies of the same composition) and to other substances or surfaces, particularly iron, steel, brass and other metals. I have found that the resin may also be effectively and tenaciously impregnated into or reinforced by various other materials, such as glass fiber cloth, metal cloth and various fibers. Nevertheless, it has not been found, so far as I am aware, that this relatively low molecular weight resin can be self-cured, in a satisfactory manner, within any short period of time.

The invention is of particular utility in connection with repair and reconstruction procedures, particularly of the type involving the wrapping of metal or like articles with fabric having an impregnation of resin material, such that upon curing the resin, a solidified, reinforced structure is established upon or about the base article. Methods of the type just mentioned, particularly for the repair or reconstruction of pipe or equivalent tubular articles (especially of steel, iron, brass or other metal), are described and claimed in the copending patent application of Kenneth D. Shaw, filed May 28, 1952, Ser. No. 290,398, for Reconstruction of Pipe; the present invention therefore embraces significant improvements in the methods and structures of the cited Shaw application.

One important aspect of the present invention is predicated on the discovery that by mixing a resin material of the epichlorohydrin-bisphenol type with certain agents, and preferably with a cooperating combination of such agents, the resulting mixture will spontaneously cure in an unusually short time and with no accompanying disadvantages either by reason of hazard or inconvenience in use or by reason of impairment of the desired qualities in the ultimate solidified product. Thus it has now been found that by using, for achievement of the primary curing or catalyzing function, a specific mixture of amines, the rate of cure of an epichlorohydrin-bisphenol resin-forming material (meaning, as explained above, such reaction product in its uncured condition) is unexpectedly accelerated, in sharp contrast to the effect of either of the amine constituents alone. More particularly, by utilizing a mixture of triethanolamine and triethylene tetramine, in admixture with the resin material, the two amines being conveniently and preferably (although not necessarily) mixed together before addition to the resin material, the resulting composition will cure spontaneously in a relatively short time, apparently by reason of a synergistic effect that characterizes the combination of the two amines when so used.

It has been further discovered that immediacy of the curing reaction and particularly a more prompt arrival at a substantially exothermic condition, can be promoted by including in the mixture a highly reactive substance which will tend almost at once to polymerize spontaneously (or to copolymerize with the resin material) in the presence of the stated amines; an outstanding substance of the category just described is allyl glycidyl ether, although similar but somewhat less effective results may be had with other, like compounds such as phenyl glycidyl ether or chlorethyl vinyl ether, all of these being polymerizable ethers which tend to react violently with an amine.

For many purposes it has further been found that certain additional agents are of cooperative and special advantage. Thus for convenience in the use of the self-curing resin mixture, e. g. including all of the above constituents, a quantity of colloidal silica may very usefully be included. The colloidal silica appears to improve the adhesive properties of the ultimate resin body, e. g. when the mixture is cured in contact with another object or surface upon which firm engagement is desired, while at the same time the silica not only moderates and distributes the heat of reaction (for avoiding non-uniformity or indeed undue violence of cure), but also tends to prevent undue loss of viscosity during intermediate stages of the curing reaction and thus to prevent the resin mixture from running off or out of place, i. e. in situations where it is no more than partially confined. For still further acceleration of the spontaneous reaction in the finally mixed body, a small content of a chlorinated compound, e. g. chlorinated hydrocarbon material, very advantageously the specific substance known as chlorinated paraffin (or alternatively, chlorinated biphenyl), may be employed; specifically, it is believed that as the mix warms up, decomposition products of the chlorinated paraffin or the like then react exothermically with the resin material, more particularly the epoxide radical of the latter, so as to release more heat and thereby to promote the attainment both of the desired, relatively high curing temperature and of the exothermic character of the principal curing or polymerizing reaction.

While the greatly improved nature of the results has been abundantly demonstrated by test, and indeed the magnified nature of the exothermic properties of the mass (e. g. in affording liberation of heat, measured as calories per gram, in an amount several times that which can be achieved in a simple mixture of the stated resin-forming material and a single amine), and while the invention is thus not to be limited to any specific theory or understanding of the chemical and physical mechanisms involved, experimental evidence strongly indicates that the several ingredients function in essentially the following manner. Assuming that the complete mixture has been prepared, including the various cooperating components described above, the object is the rapid attainment of a relatively high temperature, say of the order of 600° F. or more, and the maintenance of such temperature, by exothermic reaction, for a sufficient interval to provide thorough, uniform cure throughout the mass.

Specifically, it appears that the relatively violent reaction between the amines (or either of them) and the allyl glycidyl ether occurs and builds up quite rapidly, e. g. often in a matter of minutes, after the mixture has been established. This initial heating phase supplies sufficient energy to promote prompt reaction on the part of the epichlorohydrin-bisphenol material, the first phase of reaction of the latter being (in the complete mixture) with the chlorinated paraffin. That is to say, when a temperature of 300° F. or so is reached, it appears that the chlorinated paraffin begins to decompose, liberating nascent hydrogen chloride, which is accepted by the epoxide radical of the resin. It is understood that the last-mentioned reaction, e. g. between the chlorine or hydrogen chloride and the epoxide constituent, is itself exothermic, and thus supplies further energy, tending to carry the temperature of the mass quite rapidly to higher values, say about 600° F. Then as the mixture reaches the latter temperature, the principal curing reaction of the resin material, under influence of the amine mixture, is apparently accelerated to a considerable extent, it being nevertheless understood that such reaction has been slowly progressing, of its own accord, during these initial stages. The curing reaction by the amines then continues, according to present understanding, in an exothermic manner and with desirable uniformity, until the entire body sets in a hard, rigid, tough state, representing completion of the desired cure.

As also explained above, the colloidal silica ingredient, if used, promotes the convenience of the self-curing composition and contributes materially to the control of curing and to the characteristics of the final resin product. This product, especially as prepared from the complete mixture of components, has been found to be unusually superior, whether in a massive body or in a layer or film or as an impregnation of textile or other fibrous material, such as may be used to constitute a reinforced structure. Specifically, for example, the ultimate, cured resin body has extremely high tensile strength and unusual hardness and resistance to deformation by blows, as well as an extreme toughness, e. g. in being almost impossible to break or crack. The plastic structure is very uniform, and remarkably free from cavities, bubbles, or faults. At the same time, it is remarkably adherent, not only to reinforcing material into which it may be impregnated or with which it may be mixed, but also to adjoining parts, especially metal surfaces, against which it may be cast, so to speak by the described procedure. Finally, none of the added substances appears to have any deleterious effect on the cured, solid product.

As will be appreciated, the complete, self-curing mixture is necessarily prepared in its final state, only at the actual time of use and indeed immediately prior to such use. The curing reactions begin, say, within a few minutes or so after the mixture is completed, so that handling of the mass and its disposition at the locality or in the shape desired, must be accomplished right away; nevertheless, the described mixture, especially in its preferred forms, is conveniently not so immediate in response as to foreclose a reasonable handling time, say of a few minutes, before the onset of reaction.

A specific further feature of the invention accordingly resides in the provision of the composition in the form of a plurality of readily miscible components, which can be simply poured or otherwise stirred together at the time and place of use and which in their separate state are highly stable, e. g. can be transported or stored for long intervals at room or other ordinary temperatures. Specifically the complete composition is most conveniently embodied in two parts; the first of these two parts comprises the epichlorohydrin-bisphenol reaction product in its uncured state (e. g. usually a viscous liquid), preferably together with one or more of the constituents other than the amines. More particularly, this first component may consist of a mixture of the resin material, with the allyl glycidyl ether, the chlorinated paraffin and the colloidal silica in uniform mixture. The other component then comprises the mixture of the stated amines, viz. triethanolamine and triethylene tetramine, the latter being present in major proportion. Accordingly these two components are established as stable materials; for use of the resin-forming mixture, appropriate quantities of the two components are then simply mixed together, a special advantage being that such final mixture is readily accomplished, to an entirely uniform degree, by a simple, rapid, stirring operation. As so mixed, e. g. with a major amount of the first component and a minor amount of the amine component, the complete self-curing composition is achieved, usually in the form of a somewhat viscous but more or less liquid mass, and it may be used in the manner indicated above, to set up spontaneously into a hard, strong, durable resin body.

The total time required between initial establishment of the entire mixture and ultimate completion of curing, varies considerably with circumstances; for example the cure is much more rapid in relatively massive or thick bodies of the composition than in thin layers or in impregnated cloth where loss of heat is considerably greater. Nevertheless, even in the latter cases, an unusually rapid cure may be obtained, i. e. in a matter of 15 to 30 minutes. The time of cure is also affected by the proportions of ingredients, e. g. in that upon reducing or omitting the content of chlorinated paraffin, a somewhat slower cure is had, with particular delay in reaching the initial stages of substantial exothermic development. Likewise the polymerizable ether may be reduced in amount, or indeed omitted in some cases, with corresponding effect in lengthening the period of cure. It will also be understood, in passing, that while the colloidal silica is a presently preferred ingredient, which cooperates in the manner explained above for definite practical advantages, it is likewise optional and may be omitted in some cases.

In general, it is contemplated that the specific amine mixture is an essential ingredient for full realization of the advantages of the present improvements; yet the several supplemental ingredients, including the allyl glycidyl ether (or its equivalent), the chlorinated paraffin and the colloidal silica are nevertheless very useful, either individually or in various combinations, for effectuation of a measurably improved self-curing property when it is sought to cure an epichlorohydrin-bisphenol resin material with even a single amine, i. e. either of the amines mentioned above, or other amines or mixtures of amines. Thus even where the synergism of the described curing agent mixture is not available, the cooperative effects of one or more of the other ingredients may nevertheless be usefully realized, as for promoting self-heating and thus spontaneous curing (even though over considerably longer times) of the resin mixture.

By way of specific example, the following is one instance of a particularly effective composition, which when finally mixed is self-curing in periods of the order of 10 minutes to 40 minutes, depending on the nature and circumstances of the body of material which is left to be cured, i. e. depending particularly on the extent to which the developed heat is retained in or released from such body.

Two stable ingredients were provided, the first consisting of 70 parts by weight of the epichlorohydrin-bisphenol resin-forming material (being the uncured reaction product in the form of a heavy viscous liquid, as explained above—other examples herein being referred to the same form of the material), 10 parts of allyl glycidyl ether, 10 parts of chlorinated paraffin and 10 parts of colloidal silica. The other ingredient consisted of a mixture of 15 parts of triethanolamine and 85 parts of triethylene tetramine, all parts in this and the other ingredient being by weight. Both of these ingredients were liquids and were easily mixed together in a uniform manner, the mixture being made up to contain 100 parts of the first component (which includes the resin material), and 25 parts of the second component, i. e. the amine mixture. The resulting, rather thick liquid had all the characteristics described above, being such that appreciable heating and initiation of curing reaction would ordinarily start in a matter of 5 to 10 minutes; indeed if the mixture were simply left in the metal tank or other vessel in which it was made up, a complete cure to a hard, solid body ordinarily resulted within less than 15 minutes. When used for application of a thick coating, as on a heavy metal surface, or for impregnation of textile material such as glass fiber cloth, a slightly longer total time might elapse between the original mixture and termination of cure, e. g. time of the order of 30 minutes or so if no additional precautions were taken to prevent escape of heat.

Considerable variation in the mutual proportions of the two pre-mixed components, as well as in the proportions of ingredients in each component, has been found possible. If the amine mixture, in its optimum composition stated above, is used in less than 6 parts for each 100 parts of the resin-forming component, the cure time is greatly lengthened, i. e. ordinarily to a period of the order of several days. If substantially more than 30 parts of the amine mixture is used, no further advantage has been noted (e. g. in acceleration of the cure time), while the ultimate product may contain appreciable quantities of free amine or amines, which may be deleterious in imparting some susceptibility of moisture adsorption of which the solidified resin product is ordinarily entirely free. Indeed it may be noted in passing that the complete waterproofness of the product and its highly impervious character are an unusual and particularly valuable characteristic; this characteristic may appear even as or before the mixture undergoes its spontaneous cure, some tests having shown that effective results are had even where the mixture is placed and permitted to cure under water or with water splashing or running over it. The presently preferred range is therefore from about 5 to about 30 parts of the amine mixture to each 100 parts of the other (resin-forming) mix, and more particularly, for relatively rapid cure, at least 15 parts or so of the amine mixture.

In the first or resin-containing component, the resin-forming material itself may have a considerable range, from 100% (where no other ingredients are used) down to 50% or somewhat less. In the described mixture, particularly where one or more of the other substances may be employed, an unusually effective range of content of the epichlorohydrin-bisphenol material is from 50 to 90 parts by weight in each total of 100 parts. Generally speaking, less than about 5 parts of chlorinated paraffin, and likewise less than about 5 parts of the allyl glycidyl ether, contributes too little to the end result to be of great value, while greater than 15 parts of either or both of these components is apt to introduce excessive reactivity, e. g. generating too much heat. In consequence the preferred content of each of these substances, per 100 parts of the total of the first component (including such ingredients) is from 5 to 15 parts by weight. Where it is desired that the first component remain in a liquid or at least a partly flowable condition, the colloidal silica should not be more than 50% of the total of this component, the range for such ingredient thus being from zero to 50 parts, with considerable preference for a lower portion of such range, say from 5 to 20 parts. On the other hand, if a putty-like mixture is desired, substantially larger quantities of the colloidal silica may be used, although perhaps with some impairment of the strength or like quantities of the ultimate solidified resin.

The preferred composition of the amine mixture is of the order of 15% triethanolamine and 85% triethylene tetramine, i. e. as indicated in the above example. Some departure from this proportion of 15 parts to 85 parts (now regarded as optimum) is permissible although it appears that if the quantity of triethanolamine is less than 5 parts, i. e. 5%, the synergistic effect is negligible. That is to say, the cure rate is then relatively very slow, being essentially the same as when triethylene tetramine is used alone. When the proportion of triethanolamine is brought above about 25% (in the amine mixture), the cured product is less satisfactory, tending to assume a somewhat spongy character. It may be noted here that although the supplemental ingredients in the first component are of some utility when the resin is to be cured otherwise than by the preferred amine mixture, the chief virtue of these substances, particularly the polymerizable ether and the chlorinated compound, is in direct cooperation with the amine combination, i. e. in affording a relatively immediate promotion of the reactive conditions and of the release of heat, which can be properly availed of as the amine mixture (unlike slower curing agents) then comes promptly into play. The allyl glycidyl ether, moreover, serves a further function of reducing the viscosity of the resin component, and thus of the entire mass, at times before the onset of reaction; this ether is a thin fluid of relatively low viscosity, and thus provides good fluidity of the uncured composition where such properties are particularly desired for coating, impregnating and casting operations.

As compared with other types of self-curing resins, the present composition employing the epichlorohydrin-bisphenol reaction product and including the preferred mixture of substances in both components, is characterized by relatively little release of vapor during the curing reaction, the vapors having moreover a relatively high flash point (from the final mixture), even substantially higher than that which characterizes vapors from the two components separately. Thus in contrast to other self-curing mixtures, such as those heretofore employed with so-called polyester resins where the ingredients have potentially explosive properties (e. g. at temperatures above 150° F.) and vapors having rather low flash points (below 150° F.) are involved, the present composition and procedure are unusually safe and convenient, facilitating their use for impregnating and patching purposes in confined regions where any serious fire hazard would be intolerable.

While the specific compositions described above have been prepared as liquids or relatively flowable materials in the uncured state, very effective pastes or putty-like mixtures, preferably reinforced with fibrous components, can be effectively prepared and are alike characterized by unusual rapidity of spontaneous cure. For example, by including a substantial content of fibrous material, e. g. unwoven, loose fiber of inert character, in the first (resin-containing) component, the entire mass, as ultimately mixed, may have a non-fluid but moldable consistency, e. g. of putty-like or plastic character, so that it can be applied in a self-sustaining shape of any desired configuration and will then cure to form a rigid, strong body of such shape. Unusually effective results have been achieved with glass fibers, i. e. loose, unwoven glass fiber customarily supplied in loosely matted form; such fiber appears to be peculiarly compatible with the resin and to provide an extremely strong, well-reinforced body. Alternatively, other fibers, especially other mineral-type fibers such as asbestos or the like, may be used to yield similarly moldable, putty-like material, although with very considerably less strength than is accorded by the glass fiber.

For instance, referring to the specific example defined above as containing in its first component 70 parts of the uncured resin condensate and 10 parts each of the three supplemental ingredients, the glass fiber may be embodied directly in such component, i. e. in uniform admixture. By way of example, very effective results have been achieved by preparing a first component with 60 to 70 parts of the previously described resin-containing component and 40 to 30 parts of the absorbent filler, which may consist entirely of glass fibers or which may consist of a major part of glass fiber (say 60 to 80%) with the balance a more absorbent material, such as unwoven cotton cellulose fiber. The resulting component is a relatively stiff but doughy or plastic mass, to which the second component (being the same amine mixture) may be added at the desired time, the two being then kneaded or stirred together into a substantially homogeneous state, to provide a putty-like or moldable composition. As stated, the latter may then be utilized as desired, e. g. for building up special shapes or configurations (of great advantage in patching and repair operations as well as in making special objects or articles); the mass cures spontaneously and rapidly, e. g. in times of the order of 10 to 40 minutes (where preferred proportions of the reactive ingredients are used), resulting in a very strong solid body characterized by the desired qualities of imperviousness, adhesion, inertness and durability which have been previously stated.

As indicated, considerable variations of ingredients in these self-sustaining, moldable mixtures (which in themselves represent a special feature of the invention) is possible. For instance, the amount of colloidal silica may be increased, e. g. replacing a portion of the glass fiber or other fiber in the added absorbent filler; or alternatively, in some cases, the colloidal silica may be omitted entirely. While it is possible also or alternatively to include glass fiber in the amine component, superior results and greater convenience seem to be promoted by using the fiber only in the component that contains the resin-forming reaction product. On the other hand, the amine mixture may be usefully thickened, where desired, by including colloidal silica in it, for example up to 30% of the total weight of the amines and such silica. The amine component thus becomes a jelly-like mass (the silica being inert to the amines), which is then very easily kneaded with the dough-like mass that constitutes the first component of resin, activators and glass fiber.

In practice of the invention, it may sometimes be desirable to include a small quantity of inert coloring matter in one or both of the two components, to facilitate ascertainment of uniform admixture at the time of use. Such practice is particularly useful in the case of the self-sustaining, moldable composition where it may sometimes be a little difficult to say that a homogeneous mixture of the components has been reached. For example by coloring the amine component black, as with a small quantity of a black dye or a black pigment such as carbon black, and by leaving the dough-like resin component colorless or more or less white, the user can then simply be instructed to mix the components until a uniform grey color results.

As explained, the ultimate, cured resin product, whether with or without supplemental filling or reinforcing materials, has unusual properties of strength, hardness and durability. The cured bodies, including especially the shapes or masses produced from the putty-like or moldable compositions, are remarkably inert not only to water, acids and alkalies, but also to a variety of organic solvents such as various oils, gasoline (including aviation gasoline) and the like. Correspondingly, the products have a wide field of utility, especially for coating, repairing or manufacturing articles and structures which are to be exposed to circumstances that might well deteriorate other materials.

It is to be understood that the invention is not limited to the specific compositions and procedures herein described but may be carried out in other ways without departure from its spirit.

I claim:

1. A method of producing a solidified, cured resin, comprising mixing together, to establish a self-curing mass, a curable epichlorohydrin-bisphenol reaction product, a minor proportion of cure-promoting material selected from the class consisting of allyl glycidyl ether, phenol glycidyl ether and chloroethyl vinyl ether, and a minor proportion of curing agent material comprising 95% to 75% triethylene tetramine and 5% to 25% triethanolamine, for exothermic, spontaneous curing reaction of said reaction product.

2. The method of claim 1, which includes incorporating in said mixture a minor proportion of material selected from the class consisting of chlorinated paraffin and chlorinated biphenyl for accelerating the exothermic curing reaction.

3. A method of producing a solidified, cured resin which comprises mixing a curable epichlorohydrin-bisphenol reaction with a curing agent comprising a major proportion of triethylene tetramine and a minor proportion of triethanolamine, for exothermically curing said reaction product, and wherein the aforesaid triethanolamine constitutes from about 5% to about 25% of said curing agent.

4. A method of producing a solidified, cured resin which comprises mixing a curable epichlorohydrin-bisphenol reaction product with a curing agent comprising a major proportion of triethylene tetramine and a minor proportion of triethanolamine, for exothermically curing said reaction product, and wherein the said curing agent is present in amount equal to more than 5 parts for each 70 parts of the aforesaid curable reaction product.

5. A method of producing a solidified, cured resin which comprises mixing a curable epichlorohydrin-bisphenol reaction product with a curing agent comprising a major proportion of triethylene tetramine and a minor proportion of triethanolamine, for exothermically curing said reaction product, and wherein the curing agent is present in amount of at least 15 parts for each 100 parts of the curable reaction product and wherein the triethanolamine constitutes from about 5% to about 25% of the curing agent.

6. A method of producing a solidified, cured resin which comprises mixing a curable epichlorohydrin-bisphenol reaction product with a curing agent comprising a major proportion of triethylene tetramine and a minor proportion of triethanolamine, for exothermically curing said reaction product, and which also includes a minor proportion of a cure-promoting material selected from the class consisting of allyl glycidyl ether, phenyl glycidyl ether and chloroethyl vinyl ether, and a minor proportion of cure-accelerating material selected from the class consisting of chlorinated paraffin and chlorinated biphenyl.

7. A method of producing a solidified, cured resin comprising mixing 50 to 100 parts of a curable epichlorohydrin-bisphenol reaction product with 6 to 30 parts of an activating mixture consisting of triethanolamine and triethylene tetramine, for exothermically curing said reaction product, said triethanolamine constituting from 5% to 25% of said activating mixture.

8. The method of claim 7, which includes simultaneously mixing with the aforesaid ingredients, 5 to 15 parts of allyl glycidyl ether.

9. The method of claim 8, which includes simultaneously mixing with the aforesaid ingredients, 5 to 15 parts of chlorinated paraffin.

References Cited in the file of this patent

UNITED STATES PATENTS

| | | |
|---|---|---|
| 599,203 | Stenger et al. | Feb. 15, 1898 |
| 2,041,835 | Howland et al. | May 26, 1936 |
| 2,512,997 | Bixler | June 27, 1950 |
| 2,528,932 | Wiles | Nov. 7, 1950 |
| 2,528,934 | Wiles | Nov. 7, 1950 |
| 2,626,223 | Sattler | Jan. 20, 1953 |
| 2,653,887 | Slayter | Sept. 29, 1953 |

FOREIGN PATENTS

| | | |
|---|---|---|
| 264,818 | Switzerland | Feb. 1, 1950 |
| 930,609 | France | Aug. 18, 1947 |

OTHER REFERENCES

Epon Surface Resins; copyright 1950, by Shell Chem. Co., page 8. (Copy in Div. 50.)

Silver: Modern Plastics, vol. 78, pages 113, 114, 118, 120, and 122, November 1950.

Moss: British Plastics, November 1948, pages 521–527.